Sept. 14, 1937.  W. M. CUTLER  2,092,958

COMPENSATING PRESS ROLL DRIVE

Filed June 10, 1936  2 Sheets-Sheet 1

Inventor:
Wallace M. Cutler,

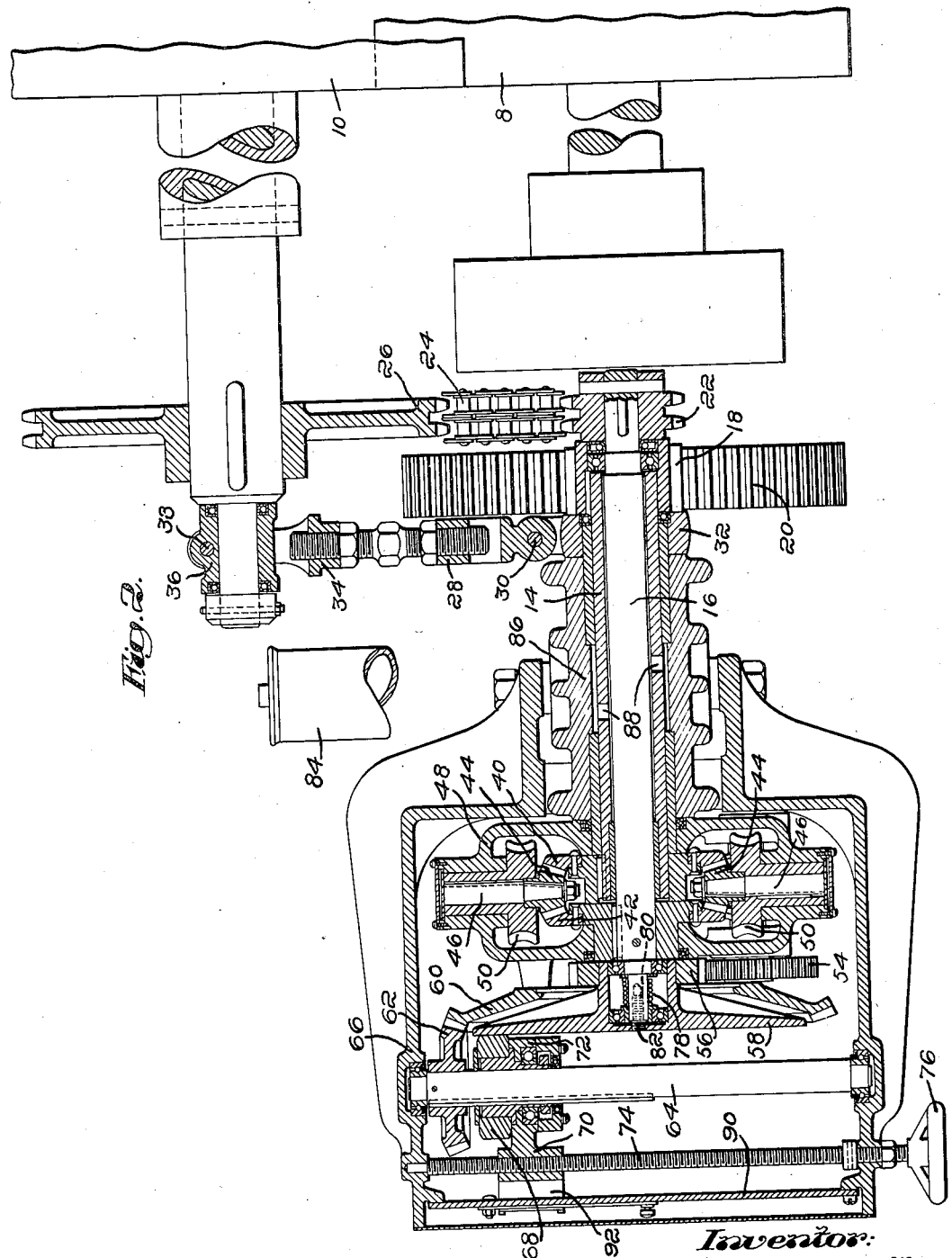

Patented Sept. 14, 1937

2,092,958

UNITED STATES PATENT OFFICE 2,092,958

COMPENSATING PRESS ROLL DRIVE

Wallace M. Cutler, Gloucester, Mass.

Application June 10, 1936, Serial No. 84,470

22 Claims. (Cl. 74—395)

This invention has to do with a compensating drive for the press rolls of a paper-making machine and objects thereof are to provide an improved variable speed gearing of the epicyclic type and an installation in connection with a paper-making machine involving such gearing whereby the relative surface speeds of the rolls of the machine may be controlled with a high degree of accuracy and this through a compact inexpensive mechanism convenient to use and adjust.

I am aware that it has been proposed to drive the upper press roll of a paper-making machine from the lower press roll at a variably controlled speed, as in French Patent 459,254 of 1913, but the constructions proposed were not efficient to attain the purposes desired.

My invention will be well understood by reference to the following description of an illustrative embodiment thereof taken in connection with the accompanying drawings, wherein:—

Fig. 2 is a longitudinal section on the line 2—2 of Fig. 1;

Figure 1:
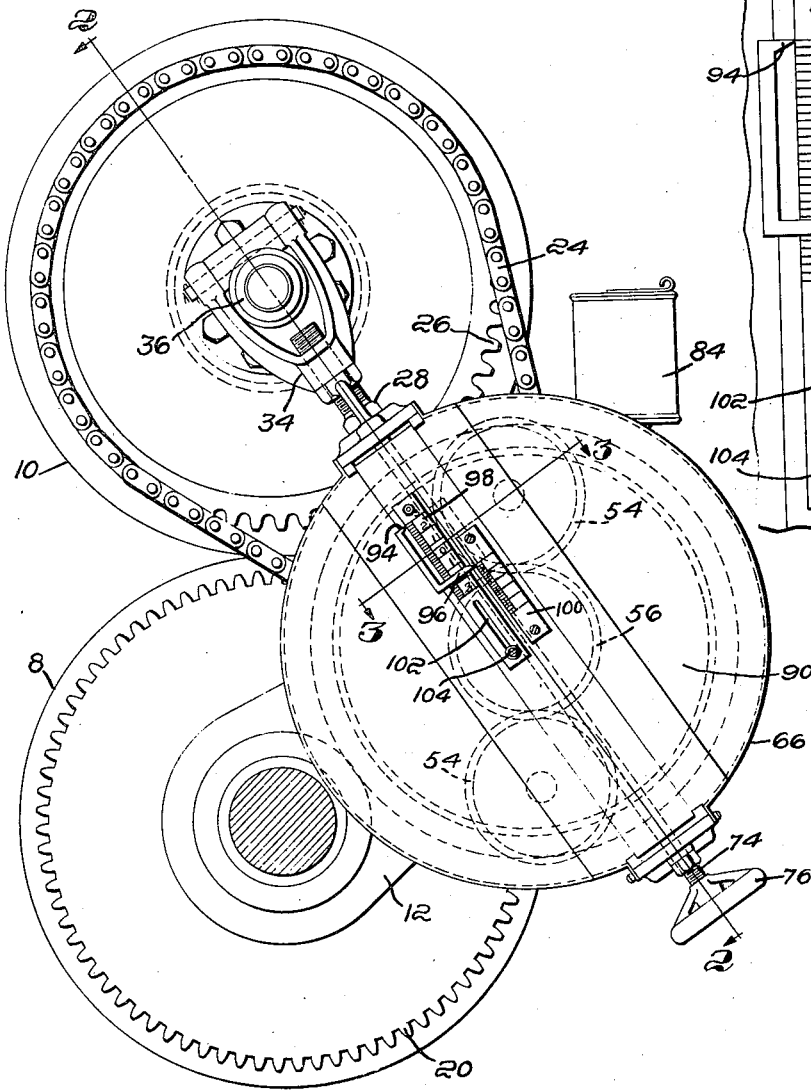
Fig. 1 is an end elevation of a pair of press rolls connected by a mechanism exemplary of the invention.

Referring to the drawings, I have there shown lower and upper press rolls 8 and 10, the lower one of which is driven by means not shown. From this lower roll the upper roll is driven at an adjustably variable speed by the mechanism which I am about to describe. Because of variances in pressure, slight differences in diameter and the actual spacing of the rolls at opposite sides of the web, provision should be made for a variable transmission to secure accurate equality of surface speed of the two or, where such an effect is desired, a determined differential in speed. Thus for some purposes it may be desirable to drive the upper roll slightly faster than the lower. I provide herein for an accurate correlation of the speed by means free of slip and for an adjustment effected without introducing errors.

Figure 3:
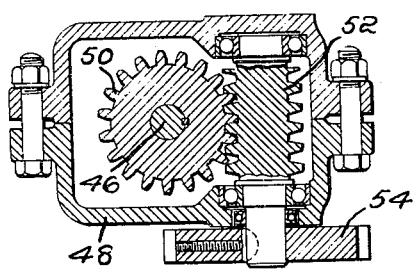
Fig. 3 is a detail section on the line 3—3 of Fig. 1.

Herein I have shown an arm 12 pivoted on the axis of the lower driven roll 8, and on the distal end of the arm, as best seen in Fig. 3, is provided a bearing for two concentric shafts, an outer quill shaft 14 and an inner shaft 16. The quill shaft carries at its inner end adjacent the rolls a pinion 18 adapted to mesh with a gear 20 moving with the lower roll 8, while the shaft 16 carries at its inner end a sprocket wheel 22 connected by chain 24 to a sprocket wheel 26 on the shaft or trunnion of the upper roll 10. The two shafts 14 and 16 are connected at their outer ends by means of an epicyclic gearing of improved construction to be hereinafter more fully explained. To provide for tensioning of the sprocket chain while the machine is running and to support the arm 8 while it is idle the outer end of the arm is supported by an adjustable strut 28 which herein takes the form of a turn-buckle pivoted on a transverse pin 30 to a collar 32 at the inner end of the arm 8, its upper end being formed with a yoke 34 embracing a sleeve 36 journalled at the outer end of the upper roll shaft and secured thereto by a transverse pivot pin 38. This provides a universal connection for the strut and permits disalignment of the shaft of the upper roll, as might take place, for example, when blankets are changed.

As previously stated, the outer ends of the shafts are connected by an epicyclic train, herein of the bevel type and comprising the bevel gear 40 mounted on the quill shaft 14 and the bevel gear 42 mounted on the end of shaft 16 which projects outwardly beyond the quill. The two are connected by the planet pinions 44 on radially disposed rotatory spindles 46 and which may revolve about the axes of the shafts with the planet carrier 48 arranged as shown to form an enclosing housing for the bevel train. A variable speed is herein provided for with great accuracy and slight expenditure of force by controlling the rotation of the planet pinions with their spindles. For this purpose the spindles carry the worm wheels 50 with which mesh worms 52, best seen in Fig. 3, the shafts of which are disposed parallel to the two shafts 14 and 16 and which project rearwardly outwardly beyond the gear casing 48 to provide for the application of force thereto to control the rotation thereof, preferably in the manner soon to be described.

Compactness of construction and accuracy of adjustment are secured by balancing the angle of the worm wheel against its coefficient of friction. If the worm wheel is locked, the pinion is locked against rotation and the pinions with the pinion carrier 48 revolve as a unit at the speed of the shafts 14 and 16 and the speed of these two shafts is the same. If, however, we permit the worm wheel to turn or, in other words, back off on the worm, the bevel pinion rotates and the output bevel gear 42 goes more slowly relatively to the positively driven or input bevel gear 40. The backing off of the worms is herein controlled through a friction drive which connects in train the spindles 46 with which the pinions rotate and another element of the epicyclic gearing, herein the pinion carrier 48. In the construction shown the shafts of the worms 52 are provided exteriorly of the casing 48 with gears 54 which mesh with a central sun gear 56 concentric with the shafts and mounted on the hub of a friction disc 58 organized at the outer end of the epicyclic gearing as a whole, the hub of the disc being mounted for free rotation on the reduced projecting end of the shaft 16. An annular bevel gear 60 supported from the outer side of the pinion carrier casing 48 meshes with a bevel pinion 62 on a shaft 64 extending transversely across the face of the disc and herein supported at its ends in a supporting casing 66 mounted in overhanging relation on the arm 12 and in effect one therewith. A friction roller 68 splined on the shaft 66 cooperates with the friction disc and may be adjusted radially of the same, herein by means of adjusting nut 70 which has an arm 72 in which the hub of the roller turns freely and which is actuated by the screw 74 journalled in casing 66 and operated by hand wheel 76 at the exterior thereof.

To insure effective contact of the parts of the frictional couple 58—68, the disc 58 may be spring pressed outwardly by spring 78 disposed within the hub of the same and encircling the reduced end of shaft 16. The end of the shaft may have a tapped opening 80 therein with which mates a central opening 82 on the disc. This permits a screw to be inserted through the opening 82 when assembling or disassembling the parts of the mechanism temporarily to secure the disc in position against the thrust of the spring which otherwise tends to throw it off the end of the shaft.

In applying this mechanism to a paper machine drive I prefer to provide such a gear ratio in the gears 18 and 20 and the sprocket drive 22—24—26 that, with the roller 68 at its outermost position the planet pinions locked and the shafts 14 and 16 turning at the same speed, the upper roll will move somewhat faster than the lower roll, adjustments being effected by slowing down the upper roll. In other words, no attempt is made to drive the output bevel gear faster than the input bevel gear, the output speed being never greater than the input speed. The worm is either locked or is backed off, and as it has nearly an irreversible thread, the amount of torque necessary for the friction device to carry is small as compared with the output torque.

It will be noticed that all the gearing elements are in constant mesh and operating about pitch lines which are invariable in all positions of adjustment and thus transmit uniform movement and permit the ratio of movement to be adjusted with great accuracy.

It will also be apparent that, given a mechanism constructed to meet an average condition taking into consideration the diameter of the rolls, their weight, speed, operation, coefficient of friction of the surfaces involved, etc., if conditions are changed, the mechanism is nevertheless adaptable by a simple alteration of the elements of the sprocket drive.

For lubrication of the system an oiling reservoir 84 is provided which delivers by gravity to the bearings of the quill shaft at 86. The oil passes through suitable openings 88 in the quill to lubricate sprocket shaft 16 and finds its way to the gear casing 48 which is maintained constantly filled with oil. To obviate the difficulties hitherto experienced in lubricating concentric shafts the oiling reservoir 84 is mounted at such an elevation that the hydrostatic head on the oil will more than balance the centrifugal force developed at the rotating surfaces involved.

Figure 4:
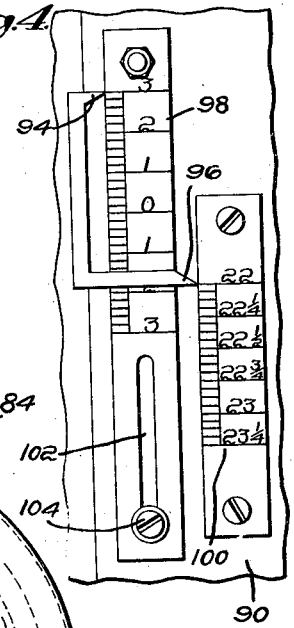
Fig. 4 is an enlarged detail of Fig. 1.

The outer end of the casing 66 may be closed by a dial plate 90 having a slot parallelling adjusting screw 74 through which may project an arm 92 carried on the nut 70 and herein shown as provided with upper and lower pointers 94 and 96 cooperating respectively with scales 98 and 100 secured to the dial plate 90, as best shown in Fig. 4. One of these scales, as 98, may be graduated in terms of the diameter of the top roll, the readings increasing inwardly, while the other, 100, may be graduated in terms of percentage of over or under drive. Scale 100 is adjustable on the dial by means of the slot 102 and clamping screw 104. With a minimum diameter of roll and the pointer 94 set thereat, the pointer 96 indicates the outermost position of the roller and the highest speed of the top roll. If the diameter of the roll is greater, obviously the rotary motion transmitted thereto should be somewhat less than for the same surface speed. Since the pointers 94 and 96 are definitely placed and an adjustment inward of the pointer 94 to a scale graduation indicating a definite diameter will cause pointer 96 to move inwardly a corresponding amount indicating a similar inward adjustment of the friction roller. If, for example, the press roll is reground, it may be measured by means of calipers and the pointer 94 set at the scale graduation indicating the diameter. The scale 100 may then be adjusted inwardly to bring its uppermost point in line with the pointer 96 indicating the position of the friction roller for a maximum percentage of overdrive and clamped. The graduations on the scale 100 in its adjusted position provide a guide for attaining by adjustment of hand wheel 76 a desired percentage of over-drive or under-drive or equality of drive for the diameter of the roll for which the proper setting has been made.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a pair of cooperating press rolls, one of which is driven, an arm mounted for swinging movement about the axis of the driven roll, a pair of shafts mounted distally thereon, a substantially non-slipping toothed driving connection from the driven roll to one of the shafts, a sprocket chain connection from the other shaft to the other roll, a toothed epicyclic train connecting the shafts, and means for variably controlling the movement of an element of the train whereby the surface speeds of the rolls may be correlated with a high degree of accuracy.

2. In combination with a pair of cooperating press rolls, one of which is driven, an arm mounted for swinging movement about the axis of the driven roll, a pair of shafts mounted distally thereon, a substantially non-slipping driving connection from the driven roll to one of the shafts, another non-slipping driving connection from the other shaft to the other roll, a toothed epicyclic train connecting the shafts, and means for variably controlling the movement of an element of the train comprising a friction disc and a friction roller adjustable across the face of the disc, one of which is geared to said element and the other to another element of the train whereby the surface speeds of the rolls may be correlated with a high degree of accuracy.

3. In combination with a pair of cooperating press rolls, one of which is driven, an arm mounted for swinging movement about the axis of one of the rolls, a pair of shafts mounted distally thereon, a substantially non-slipping toothed driving connection from said one roll to one of the shafts, a sprocket chain connection from the other shaft to the other roll, a toothed epicyclic train connecting the shafts, and means for variably controlling the movement of an element of the train including a worm and worm wheel transmitting pair whereby the surface speeds of the rolls may be correlated with a high degree of accuracy.

4. In combination with a pair of cooperating press rolls, one of which is driven, an arm mounted for swinging movement about the axis of one of the rolls, a pair of shafts mounted distally thereon, a substantially non-slipping toothed driving connection from the said one roll to one of the shafts, a sprocket chain connection from the other shaft to the other roll, a toothed epicyclic train connecting the shafts, and means for variably controlling the movement of an element of the train comprising a friction disc and a friction roller adjustable across the face of the disc, one of which is geared to said element through a worm and the other to another element of the train whereby the surface speeds of the rolls may be correlated with a high degree of accuracy.

5. In combination with a pair of cooperating press rolls, one of which is driven, an arm mounted for swinging movement about the axis of one of the rolls, a pair of shafts mounted distally thereon, a positive drive from the driven roll to one of the shafts, a band drive from the other shaft to the other roll, means for connecting the shafts having provision for variably controlling the motion of an element thereof and an adjustable strut extending from said arm and having a universal connection with the upper roll.

6. In combination with a pair of cooperating press rolls, one of which is driven, an arm mounted for swinging movement about the axis of the driven roll, a pair of shafts mounted distally thereon, a gear drive from the driven roll to one of the shafts, a band drive from the other shaft to the other roll, an epicyclic gearing connecting the shafts having provision for variably controlling the motion of an element thereof and an adjustable strut extending from said arm, a sleeve mounted to turn about the axis of the said other roll to which the other end of the strut is connected, the strut also embodying a transverse pivot.

7. In connection with a pair of cooperating press rolls, one of which is driven, an arm mounted for swinging movement about the axis of the driven roll, a pair of shafts mounted distally thereon, a gear drive from the driven roll to one of the shafts, a band drive from the other shaft to the other roll, an epicyclic gearing connecting the shafts having provision for variably controlling the motion of an element thereof and an adjustable strut extending from said arm, a sleeve mounted to turn about the axis of the said other roll, a yoke embracing the same and secured thereto by a transverse pivot, the strut being connected to said yoke.

8. In combination with a pair of cooperating press rolls, one of which is driven, an arm mounted for swinging movement about the axis of the driven roll, concentric shafts, one surrounding the other, mounted distally on the arm, a substantially non-slipping driving connection from the driven roll to the inner end of one of the shafts, a sprocket chain connection from the inner end of the other shaft to the other roll, an epicyclic gearing connecting the shafts at their other ends and comprising an intermediate pinion carrier, worm wheels on the pinion shafts, worms meshing therewith, and means mounted outwardly of the gearing at said other ends of the shafts for controlling through the worms the rotation of the pinion shafts.

9. In combination with a pair of cooperating press rolls, one of which is driven, an arm mounted for swinging movement about the axis of the driven roll, concentric shafts, one surrounding the other, mounted distally on the arm, a substantially non-slipping driving connection from the driven roll to the inner end of one of the shafts, a sprocket chain connection from the inner end of the other shaft to the other roll, an epicyclic gearing of the bevel type connecting the shafts at their other ends and comprising an intermediate planet pinion carrier and an adjustable frictional train correlating the rotation of the pinions about their axes and the revolution of the same with the carrier.

10. In combination with a pair of cooperating press rolls, one of which is driven, an arm mounted for swinging movement about the axis of the driven roll, concentric shafts, one surrounding the other, mounted distally on the arm, a substantially non-slipping driving connection from the driven roll to the inner end of one of the shafts, a sprocket chain connection from the inner end of the other shaft to the other roll, an epicyclic gearing connecting the other outer ends of the shafts, and means comprising a member overhung from the arm outwardly of the gearing for controlling one of the elements of the gearing.

11. In combination with a pair of cooperating press rolls, one of which is driven, an arm mounted for swinging movement about the axis of the driven roll, concentric shafts, one surrounding the other, mounted distally on the arm, a substantially non-slipping driving connection from the driven roll to the inner end of one of the shafts, a sprocket chain connection from the inner end of the other shaft to the other roll, an epicyclic gearing connecting the shafts at their other ends and comprising an intermediate pinion carrier, worm wheels on the pinion shafts, worms meshing therewith, a friction disc mounted outwardly of the gearing at said other ends of the shafts, a transverse shaft having a cooperating friction roller adjustable therealong, one of the friction elements being in train with the worms and the other in train with an element of the gearing which revolves about the axis of the shafts.

12. In combination with a pair of cooperating press rolls, one of which is driven, a pair of countershafts, a toothed epicyclic train connecting the shafts, a worm controlling the movement of an element of the train, adjustable means controlling backing off of the worm, and substantially non-slipping toothed driving connections between said rolls and countershafts respectively constructed and arranged to produce, when the worm locks the element controlled thereby and the countershafts move at the same speed, an increased output speed relatively to the input speed.

13. In combination with a pair of cooperating press rolls, one of which is driven, a variable speed connection between the same including an epicyclic toothed gearing and means for controlling the movement of an element thereof comprising a rotary friction disc and a friction roller adjustable across the face of the same, definitely spaced pointers moving with the roller in its movement of adjustment, a scale cooperating with one of the pointers graduated in terms of roll diameter, and an adjustable scale cooperating with the other pointer and graduated in terms of relative input and output speeds.

14. A mechanism for connecting driving and driven rotary elements comprising a pair of concentric shafts, one surrounding the other, and having at one end means whereby power is applied to one and delivered from the other, an epicyclic gearing connecting the shafts at their other ends and comprising an intermediate pinion carrier, worm wheels on the pinion shafts, worms meshing therewith, and means mounted outwardly of the gearing at said other ends of the shafts for controlling through the worms the rotation of the pinion shafts.

15. A mechanism for connecting driving and driven rotary elements comprising a pair of concentric shafts, one surrounding the other, and having at one end means whereby power is applied to one and delivered from the other, an epicyclic gearing connecting the shafts at their other ends and comprising an intermediate pinion carrier, worm wheels on the pinion shafts, worms meshing therewith, a friction disc mounted outwardly of the gearing at said other ends of the shafts, a transverse shaft having a cooperating friction roller adjustable therealong, one of the friction elements being in train with the worms and the other in train with an element of the gearing which revolves about the axis of the shafts.

16. A mechanism for connecting driving and driven rotary elements comprising a pair of concentric shafts, one surrounding the other, and having at one end means whereby power is applied to one and delivered from the other, an epicyclic gearing connecting the shafts at their other ends and comprising an intermediate pinion carrier, worm wheels on the pinion shafts, worms meshing therewith, a friction disc mounted outwardly of the gearing at said other ends of the shafts, a sun gear carried thereby and planet gears on the worm shafts meshing therewith, a transverse shaft having a cooperating friction roller adjustable therealong, and means gearing the shaft to the pinion carrier.

17. A mechanism for connecting driving and driven rotary elements comprising a pair of concentric shafts, one surrounding the other, and having at one end means whereby power is applied to one and delivered from the other, bevel gears at the opposite ends of the shafts, an enclosing casing therefor constituting a pinion carrier, bevel planet pinions carried thereby and cooperating with the gears, worm wheels carried by the pinions, worms meshing with the pinions and having spindles extending parallel to said shafts to the exterior of the casing, and means mounted outwardly of the gear casing at the said other ends of the shafts gearing with said spindles to control rotation of the pinions on their axes.

18. A mechanism for connecting driving and driven rotary elements comprising a pair of concentric shafts, one surrounding the other, and having at one end means whereby power is applied to one and delivered from the other, bevel gears at the opposite ends of the shafts, an enclosing casing therefor constituting a pinion carrier, bevel planet pinions carried thereby and cooperating with the gears, worm wheels carried by the pinions, worms meshing with the pinions and having spindles extending parallel to said shafts to the exterior of the casing, gears on the outer ends of the spindles, a sun gear meshing therewith, a friction disc mounted outwardly of the gear casing at the outer ends of the shafts with which the sun gear is connected, a transverse shaft having a cooperating friction roller adjustable therealong, and means gearing the shaft to the casing.

19. A mechanism for connecting driving and driven rotary elements comprising an arm mounted for adjustable swinging movement about the axis of one of the elements and providing distally thereof a support for the central portions of concentric shafts, one within the other, the shafts having at one end means for connecting one to the driving element to be rotated thereby and for connecting the other to the driven element, an epicyclic gearing connecting the other outer ends of the shafts, and means comprising a member overhung from the arm outwardly of the gearing for controlling one of the elements of the gearing.

20. A mechanism for connecting driving and driven rotary elements comprising an arm mounted for adjustable swinging movement about the axis of one of the elements and providing distally thereof a support for the central portions of concentric shafts, one within the other, the shafts having at one end means for connecting one to the driving element to be rotated thereby and for connecting the other to the driven element, an epicyclic gearing connecting the other outer ends of the shafts, worms controlling the rotation of one element of the gearing, a friction disc mounted outwardly of the gearing and concentric with the shafts, a transverse shaft supported from the arm outwardly of the disc and having a friction roller adjustable therealong, means for rotating one of the frictional elements responsively to the rotation of the worms and the other responsively to the rotation of another element of the gearing.

21. A mechanism for connecting driving and driven rotary elements comprising a pair of concentric shafts, one surrounding the other, and having at one end means whereby power is applied to one and delivered from the other, an epicyclic gearing of the bevel type connecting the shafts at their other ends and comprising an intermediate planet pinion carrier and an adjustable frictional train correlating the rotation of the pinions about their axes and the revolution of the same with the carrier.

22. A mechanism for connecting driving and driven rotary elements comprising a pair of concentric shafts, one surrounding the other, and having at one end means whereby power is applied to one and delivered from the other, an epicyclic gearing connecting the shafts at their other ends and comprising planet pinions, spindles parallel to the shafts rotated responsively to the rotation of said pinions, said spindles being in train through a worm and worm wheel with a friction disc mounted outward of the gearing at said other ends of the shafts and a transverse shaft supported outwardly of the disc having a friction roller adjustable therealong and means for rotating the shaft in train with another element of the epicyclic gearing.

WALLACE M. CUTLER.